United States Patent
Lawrence

(10) Patent No.: US 8,336,498 B2
(45) Date of Patent: Dec. 25, 2012

(54) SYSTEM AND METHOD FOR SUPER-INTENSIVE SHRIMP PRODUCTION

(75) Inventor: Addison Lawrence, Port Aransas, TX (US)

(73) Assignee: The Texas A&M University System, College Station, TX (US)

(*) Notice: Subject to any disclaimer, the term of this patent is extended or adjusted under 35 U.S.C. 154(b) by 237 days.

(21) Appl. No.: 12/775,611

(22) Filed: May 7, 2010

(65) Prior Publication Data
US 2010/0294202 A1 Nov. 25, 2010

Related U.S. Application Data

(60) Provisional application No. 61/177,863, filed on May 13, 2009.

(51) Int. Cl.
*A01K 61/00* (2006.01)
(52) U.S. Cl. ......... 119/211; D30/131; 119/224; 119/226
(58) Field of Classification Search ................ 119/200, 119/204–207, 216, 217, 223–225, 234, 236, 119/240, 201, 202, 203, 218, 226, 227, 228, 119/229; D30/131, 132, 133
See application file for complete search history.

(56) References Cited

U.S. PATENT DOCUMENTS

| | | | | | |
|---|---|---|---|---|---|
| 463,397 | A | * | 11/1891 | Walton, Sr. | 119/239 |
| 2,302,336 | A | * | 11/1942 | MacDonald | 119/214 |
| 2,537,219 | A | * | 1/1951 | Girton | 220/4.16 |
| 2,680,424 | A | * | 6/1954 | Brown | 119/203 |
| 3,766,888 | A | * | 10/1973 | Wiegardt, Jr. | 119/240 |
| D242,813 | S | * | 12/1976 | Walker | D30/131 |
| 4,226,210 | A | * | 10/1980 | Lockwood et al. | 119/236 |
| 4,244,486 | A | * | 1/1981 | Ewald, Jr. | 220/646 |
| 4,368,691 | A | * | 1/1983 | Brune | 119/207 |
| D271,954 | S | * | 12/1983 | Neil | D11/156 |
| D271,955 | S | * | 12/1983 | Neil | D11/156 |
| 4,467,743 | A | * | 8/1984 | Dugan et al. | 119/207 |
| 4,559,902 | A | * | 12/1985 | Mason et al. | 119/209 |
| 5,377,624 | A | | 1/1995 | Craig et al. | 119/234 |
| 6,305,323 | B1 | * | 10/2001 | Tsai | 119/234 |
| 7,690,330 | B2 | * | 4/2010 | Miller | 119/228 |

(Continued)

FOREIGN PATENT DOCUMENTS

| WO | WO 01/06847 | 2/2001 |
|---|---|---|
| WO | 2008/034173 | 3/2008 |

OTHER PUBLICATIONS

International Search Report and Written Opinion; PCT/US2010/034293; pp. 7, Dec. 21, 2010.

(Continued)

*Primary Examiner* — Rob Swiatek
*Assistant Examiner* — Ebony Evans
(74) *Attorney, Agent, or Firm* — Jackson Walker L.L.P.

(57) ABSTRACT

A shrimp aquaculture structure including a set of at least two raceways each having a length, width, and at least one depth to give an average depth, and including two ends, two side walls having a top, a sloped bottom joining each side wall at two side wall junctions. Some of five raceways may be stacked at least partially on top of another of the five raceways. According to another embodiment, the disclosure relates to a process of shrimp aquaculture by using the set of five raceways and sequentially transferring shrimp form one raceway to another once the shrimp reach a given average size.

28 Claims, 12 Drawing Sheets

U.S. PATENT DOCUMENTS

| | | | |
|---|---|---|---|
| 2004/0134443 A1 | 7/2004 | Warecki | 119/228 |
| 2005/0120970 A1 | 6/2005 | Massingill et al. | 119/216 |
| 2008/0216757 A1* | 9/2008 | Tseng | 119/206 |

OTHER PUBLICATIONS

Addison; "Purchase Super-Intensive Shrimp Farming Technology from Texas A&M University"; www.shrimpnews.com; pp. 2, 2010.

K-Box International Web site; K Box Cones; http://jkanda.damon.fastmail.net/kbox/; pp. 16, Jun. 2010.

K Box Cones for Fish and Aquatic Animals; http://finfish.org/blog/k-box-cones-for-aquatic-fish-and-animals/; pp. 10, Jul. 20, 2009.

The David Suzuki Foundation & the George Strait Alliance; "Global Assesment of Closed System Aquaculture"; Ecoplan Internation, Inc.; pp. 81, May 2008.

* cited by examiner

SYSTEM AND METHOD FOR SUPER-INTENSIVE SHRIMP PRODUCTION

PRIORITY CLAIM

The present application claim priority under 35 U.S.C. §119 to U.S. Provisional Patent Application Ser. No. 61/177,863, filed May 13, 2009, which is incorporated by reference herein.

TECHNICAL FIELD

The present disclosure relates to a system and method for super-intensive shrimp production using low water depth, low water volume, or low amounts of floor space. The system and method may employ raceways having particular slopes to facilitate water draining, water circulation, or shrimp harvesting. In particular embodiments, the system and method may use particular shrimp raceway designs which may be combined with particular water quality tolerances and water treatment systems.

BACKGROUND

Shrimp harvesting from the world's oceans can no longer safely meet demand for shrimp. Accordingly, methods for controlled and enhanced shrimp production or shrimp farming have been developed. The currently predominant methods typically use ponds for commercial production of shrimp. These methods, while successful, still suffer some drawbacks including the use of substantial amounts of water and requirements for large amounts of space by the structures in which the shrimp are grown. Further, although shrimp are well-suited to aquaculture, they have specialized needs as compared to other aquaculture species that should be taken into account, which sometimes hinders the ability to adapt techniques useful with other species to shrimp production. Finally, because most shrimp do not grow well in environments where the temperature is less than around 26° C. for around a month or more, pond-based methods may be used only seasonally in non-tropical locations such as the United States.

Typical raceway designs presently being used have 0.6 to 3.7 meter water depth which results in greater floor space need and has management drawbacks resulting in greater production costs. The disclosure provides technology for stacked raceways, thereby reducing the floor space required and improving the internal rate of return.

Further, there is a need to develop technologies to allow shrimp production to be commercially successful inland and away from the coastal zone and near major markets such as Chicago, Las Vegas, Dallas, etc. Accordingly, a need exists for new technologies that allow intensive production of shrimp such as may be used in commercial farming. The technologies disclosed herein may allow non-tropical shrimp farming to be competitive with farming in the tropics or may also improve shrimp farming in tropical locations.

SUMMARY

According to one embodiment, the disclosure relates to a shrimp aquaculture structure including a set of at least two raceways of increasing average depth each having a length and width and including two ends, two end walls, two side walls having a top, a bottom, and a side wall depth, and a sloped bottom having an average internal depth and joining each side wall at two side wall junctions. The sloped bottom of each raceway may have a slope of between 0.05% and 20%. The bottom may slope down from a bottom apex to the side wall junctions or may slope up from a bottom nadir to the side wall junctions. At least one of the at least two raceways may be stacked at least partially on top of another of the five raceways.

According to a more specific embodiment, the structure may be part of a system that may also include water and a water circulation and maintenance system. The water may have an average depth in the set of raceways of 30 cm or less. The water in the set of raceways may be exchanged by the water maintenance or circulation system in an amount up to 1000% of the total volume of the water in the set or raceways per day.

According to another embodiment, the disclosure relates to a process of shrimp aquaculture by providing a set of at least two raceways of increasing average depth each having a length and width and having two side walls and a sloped bottom joining each side wall at two side wall junctions, wherein the sloped bottom of each raceway has a slope between 0.05% and 20%. In the method, the first raceway may be stocked with postlarval shrimp, which are then grown to a predetermined size. The shrimp may then be transferred to a second raceway having a greater average depth until the shrimp reach a second predetermined size. The shrimp may then be harvested or transferred to still further raceways with increasing average depths and growth to increasing sizes before transfer. The shrimp may finally be harvested. The shrimp may also be partially harvested between raceways.

According to a particular embodiment, the disclosure includes a method of shrimp aquaculture including stocking a first raceway with a first average depth with postlarval shrimp, growing the shrimp to a first average size of between 0.5 g and 2.5 g, transferring substantially all of the shrimp to a second raceway having a second average depth greater than the first average depth, growing the shrimp to a second average size of between 6 g and 11 g, transferring substantially all of the shrimp to a third raceway having a third average depth greater than the second average depth, growing the shrimp to a third average size of between 12 g and 19 g, transferring substantially all of the shrimp to a fourth raceway having a fourth average depth greater than the third average depth, growing the shrimp to a fourth average size of between 17 g and 25 g, transferring substantially all of the shrimp to a fifth raceway having a fifth average depth greater than the fourth average depth, growing the shrimp to a fifth average size of between 23.5 g and 33.5 g; and harvesting the shrimp crop. Each raceway may have a length and width, two side walls and a sloped bottom with a bottom nadir or a bottom apex, the sloped bottom joining each side wall at two side wall junctions, slope from the bottom nadir to the side wall Embodiments of the current disclosure may achieve one or more of the following advantages: Aquaculture of shrimp using a total water volume per weight of shrimp produced significantly less, such as, as much as three times less, than with conventional techniques.

Aquaculture of shrimp in significantly lower average water depths (e.g. as low as 2.5 cm, or 2-3 times lower) than conventional techniques.

Aquaculture of shrimp using significantly less area (e.g. floor space) per weight of shrimp, such as up to three to five times less, than obtained with conventional techniques.

Aquaculture of shrimp achieving significantly greater shrimp production per cubic meter of water in which shrimp are grown, e.g. greater than 25 kg shrimp per cubic meter of water per crop and even as much as 70 kg shrimp per cubic meter or water per crop.

Aquaculture of shrimp achieving significantly greater shrimp growth, such as growth rates of greater than 1.5 per week higher than obtained with conventional techniques.

Aquaculture of shrimp at higher densities per cubic meter than obtained with conventional techniques, even with lower feed conversion rates.

Aquaculture of shrimp achieving significantly greater survival, such as 80% survival, than obtained with conventional techniques, even at production levels greater than 25 kg/m$^2$ per crop.

Aquaculture in a variety of climates and geographic locations, including those not typically compatible with shrimp aquaculture, by allowing climate modifications.

Aquaculture in enclosed or partially enclosed buildings such as warehouses and greenhouses.

BRIEF DESCRIPTION OF THE DRAWINGS

A more complete and thorough understanding of the present embodiments and advantages thereof may be acquired by referring to the following description taken in conjunction with the accompanying drawings, in which like reference numbers indicate like features, and wherein.

DETAILED DESCRIPTION

The present disclosure relates to systems and methods for super-intensive production of shrimp. Embodiments of the disclosure may include water quality tolerances to facilitate super-intensive shrimp production as well as structures for use in such production. According to one embodiment, shrimp raceways may use low average water depth. Unlike conventional shrimp raceways, which typically have an average water depth of approximately one meter (range of 0.6 to 3.7 meters), low average water depth raceways (e.g. 30 cm or less) may be readily stacked (two or more raceways on top of each other), allowing growth of high amounts of shrimp per area (e.g. amount of floor space utilized).

According to one embodiment of the disclosure, shrimp may be grown in a raceway or series of raceways having low water volume and low average water depths. The low water volume and low average water depths may allow the construction of stacks of two or more at a reduced cost, thus increasing the internal rate of return desirable for commercialization of shrimp farming. In a particular embodiment, there may be between two and seven raceways, particularly five raceways, including combined raceways.

These raceways may also, in a specific embodiment, be stacked to minimize the square meter of ground used in shrimp production. In general, each raceway may have a structure as shown in FIG. 1. The raceways may have end walls 10 that may typically be between 2 m and 10 m wide. The remainder of the raceway will typically have the same width as the end walls. The raceways also may have side walls 20 that may typically be between 2.5 cm and 50 cm, more particularly 5 cm and 20 cm deep. Although side walls 20 do not necessarily have to have the same depth, in many embodiments they will. In other embodiments, the side walls may have different depths for different raceways. In still other embodiments, the side walls may have different depths along the same raceway.

Figure 1A:
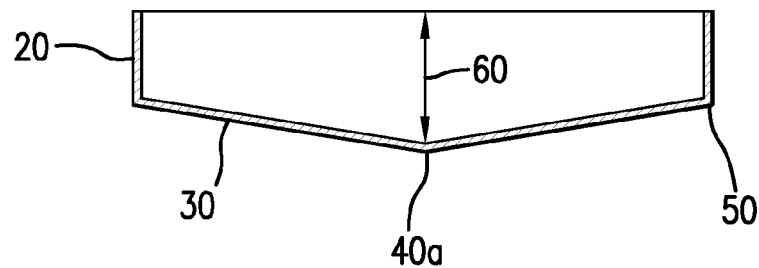
FIG. 1A illustrates an end view of a raceway with a bottom nadir and FIG. 1B illustrates a side view of a raceway with a bottom nadir.
Figure 1B:
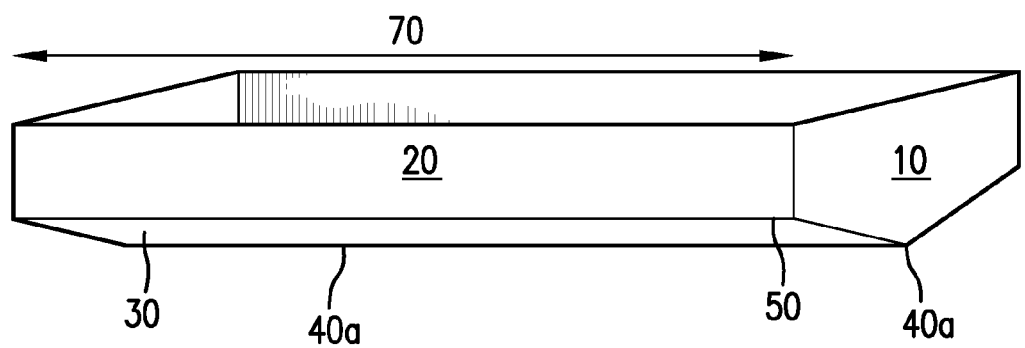
Figure 1C:
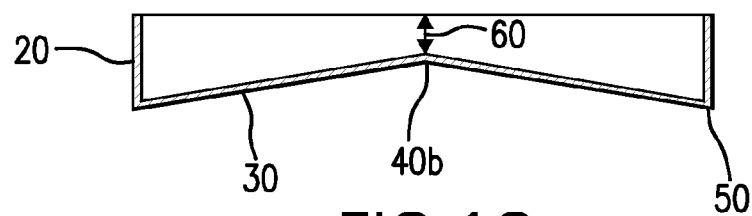
FIG. 1C illustrates and end view of a raceway with a bottom apex. Drawings are not to scale.

The raceways as shown in FIGS. 1A and 1B may also have a sloped bottom 30 with a bottom nadir 40a which meets side walls 20 at side wall/bottom junctions 50. Alternatively, as shown in FIG. 1C, the raceways may have a sloped bottom 30 with a bottom apex 40b which meets side walls 20 at side wall/bottom junctions 50. Sloped bottom 30 may be made from a single panel, two panels that join at bottom nadir 40a or bottom apex 40b, or multiple panels. The raceways may also have an internal depth 60, measured from the top of the highest sidewall 20 to the bottom nadir 40a or from the top of the highest sidewall 20 to side wall/bottom junctions 50 (when a bottom apex 40b is present). The internal depth 60 may be the same throughout the raceway or it may vary along the raceway. Regardless, the raceway may have an average internal depth that may typically be between 8 and 25 cm. The raceway may also have an average depth representing the average distance between the tops of side walls 20 and bottom 30. In general, the depth of side walls 20, internal depth 60, the average side wall depth, the average internal depth, and average depth may be greater in raceways for larger shrimp than in raceways for smaller ones. The depth of side walls 20, in one embodiment, may be between 2.5 cm and 50 cm, more particularly between 5 cm and 25 cm. Similarly, the internal depth 60 or the average internal depth, in one embodiment, may be between 2.5 cm and 50 cm, more particularly between 5 cm and 20 cm. The average depth may also be between 2.5 cm and 50 cm, more particularly between 5 cm and 25 cm. In embodiments in which the raceways contain water, it may have an average internal depth of less than 30 cm. The raceways may have a length 70 that may be any length, but in particular embodiments may be at least 10 meters long, more particularly between 20 and 60 meters long, but may be as long as 100 meters.

In some embodiments, the slope of sloped bottom panel 30 as measured from side wall/bottom junctions 50 to bottom nadir or from bottom apex 40 to side wall/bottom junctions 50 may be between 0.05% and 20%, particularly between 0.1% and 10%, more particularly between 0.2% and 5%. Alternative bottom arrangements, such as bottoms with multiple sloped panels, may also be used.

Figure 2:
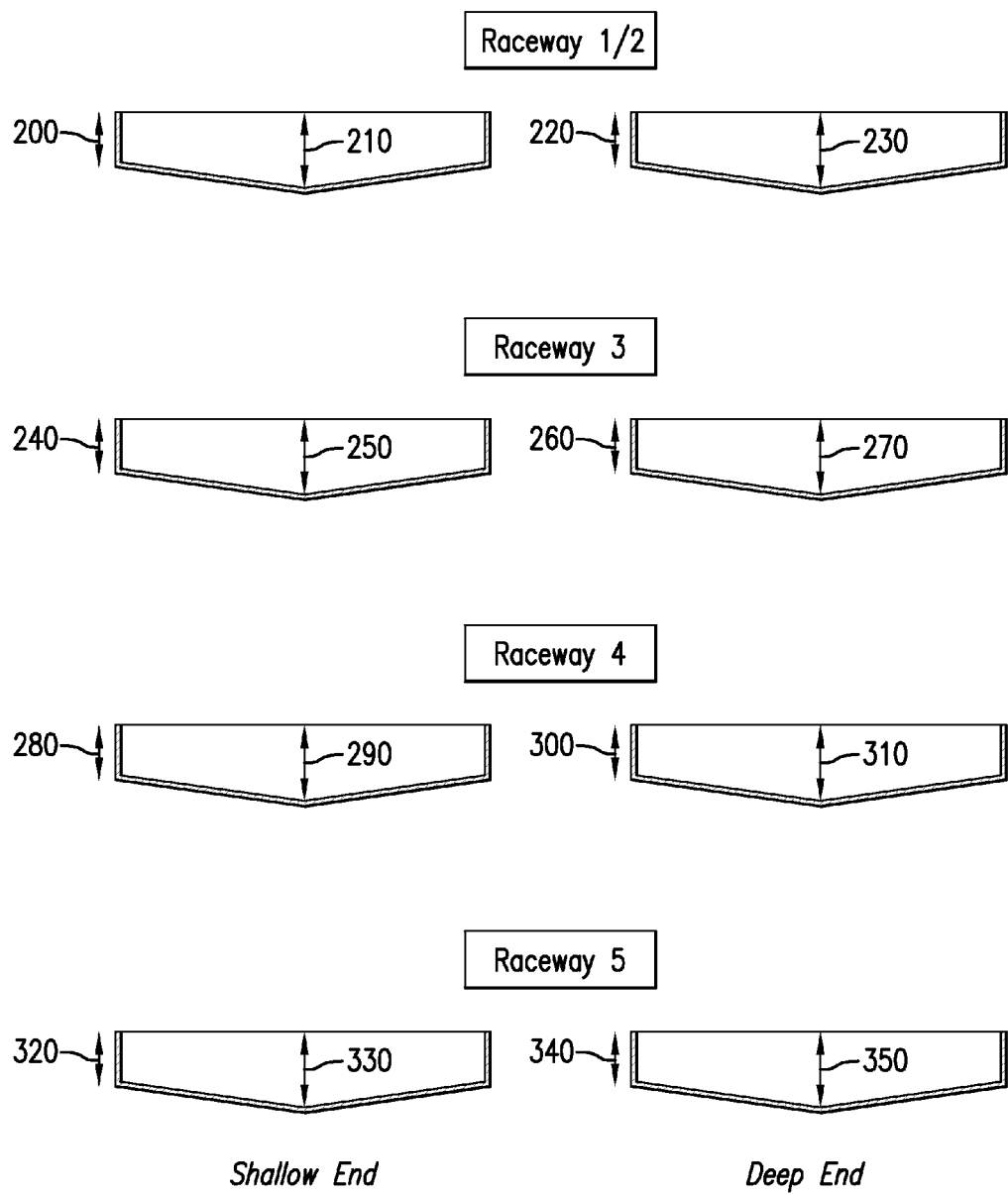
FIG. 2 illustrates depths for a series of five raceways. Drawing is not to scale.
Figure 3:
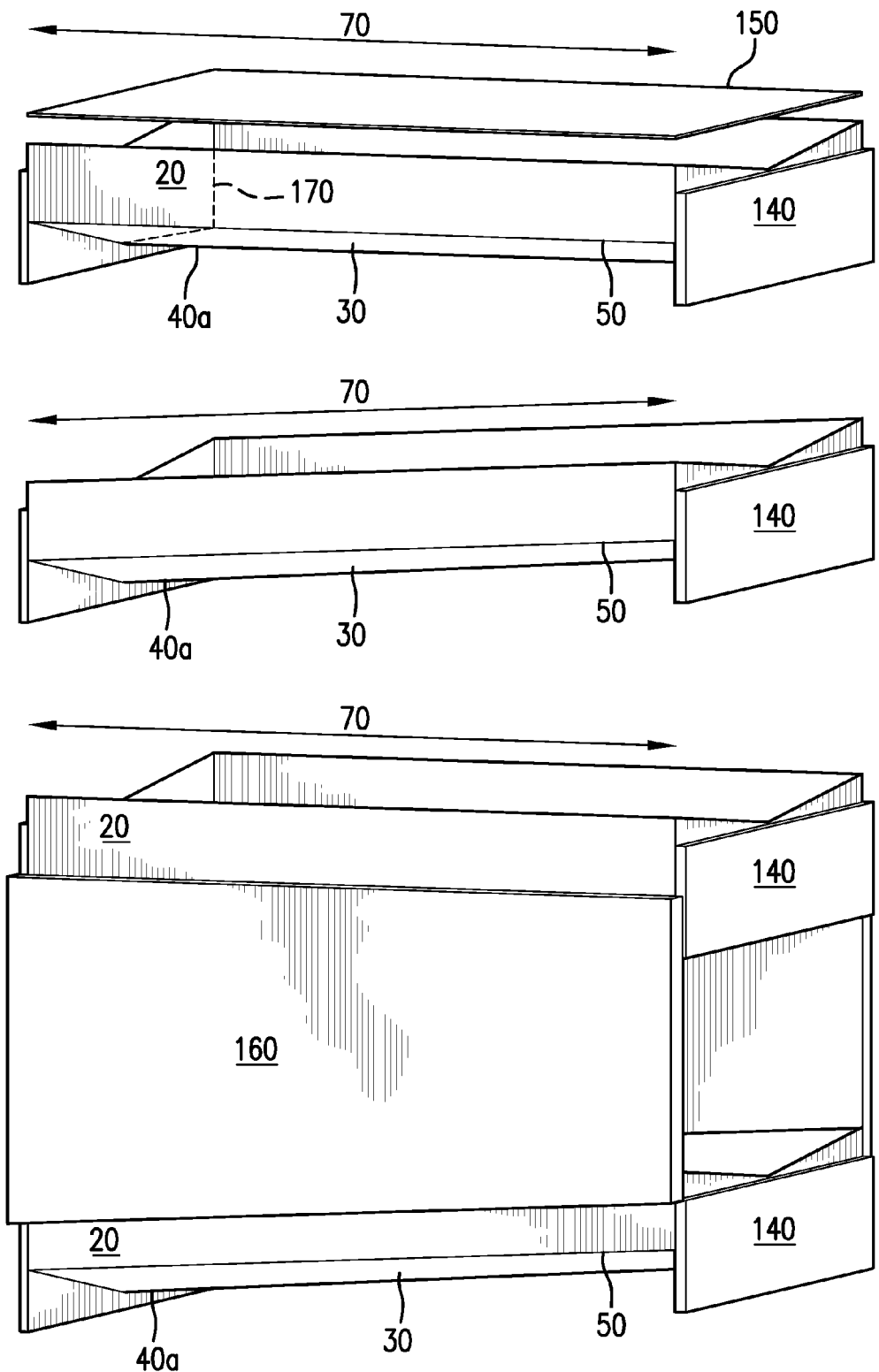
FIG. 3 illustrates dimensions and example physical shape characteristics for a stacked raceway system. Drawing is not to scale.

In some embodiments, the width of the raceway and possibly also the slope of sloped bottom panels 30 may both be varied depending on the dimensions of the building or other facility in which the raceway is housed as well as construction costs. Although FIGS. 1-3 illustrate raceways of generally the same size and shape, raceways in a set of raceways may vary in size and shape. Variations may be useful, for example, to accommodate building configurations, circulation systems, and the like.

The raceways may be arranged such that one end is higher than the other end. Alternatively, the raceways may be approximately the same height along their entire length. If the two ends are not the same height, the higher end will have shallower water and the lower end will have deeper water. Raceways may also be generally horizontal but with one end shallower than the other. The slope of the raceway from end to end may, in some embodiments, be between 0% and 1.0%, more particularly between 0.05% and 0.5%. The slope of each raceway from one end to the other may affect ease of transfer of shrimp from one raceway to another, particularly in stacked raceways, as well as ease of waste removal.

According to some embodiments, the raceways may be used in a system of raceways with increasing average water depth for larger shrimp. Each raceway corresponds to a stage in shrimp production, i.e. raceway one corresponds to a first stage. Time spent in each raceway may depend on the production methodology used, the shrimp growth rate, and the desired final size. When possible, the overall process may be performed so that the amount of time spent in each raceway stage is equal. Although example depths for raceways are provided below, in general the depths of each raceway, including its average depth, may depend on the size of the shrimp it is intended to contain, with larger shrimp in raceways with greater depths.

Shrimp size as discussed in the current specification is typically measured in terms of average weight. One of ordinary skill in the art will understand that, for example, a stock of 2 g shrimp may contain shrimp having a variety of weights, but the average weight of all the shrimp in that stock would be approximately 2 g.

For example, postlarval shrimp between five and thirty days old maybe stocked into a first raceway. The postlarval shrimp may be maintained in the first raceway for three to eight weeks. Typically, the biomass of at the end of the first raceway period may be between 1 and 5 kg/m$^2$ bottom 30 surface area. The final shrimp individual size may be between 0.5 and 2.5 g. In one specific embodiment shown in FIG. 3, the shrimp may have a biomass of 1 to 5 kg/m$^2$ of bottom 30 surface area and an individual size of between 1.0 and 2.0 g. Time spent in raceway one may be approximately one to two months.

Shrimp may then be moved to raceway two and grown for three to eight weeks until the biomass is between 1 and 5 kg/m$^2$ of bottom 30 surface area. The final shrimp individual size may be between 6 and 11 g. In one specific embodiment shown in FIG. 3, the shrimp may have a biomass of 1 to 5 kg/m$^2$ of bottom 30 surface area and an individual size of between 7.5 and 9.5 g. Time spent in raceway one may be approximately one month.

Shrimp may then be moved to raceway three and grown for three to eight weeks until the biomass is between 1 and 5 kg/m$^2$ of bottom 30 surface area. The final shrimp individual size may be between 12 and 19 g. In one specific embodiment shown in FIG. 3, the shrimp may have a biomass of 1 to 5 kg/m$^2$ of bottom 30 surface area and an individual size of between 14 and 16 g. Time spent in raceway one may be approximately one to two months. At the end of the time spent in raceway three, in some embodiments the shrimp may be partially harvested and removed from the aquaculture process.

Shrimp may then be moved to raceway four and grown for three to eight weeks until the biomass is between 1 and 5 kg/m$^2$ of bottom 30 surface area. The final shrimp individual size may be between 17 and 25 g. In one specific embodiment show in FIG. 3, the shrimp may have a biomass of 1 to 5 kg/m$^2$ of bottom 30 surface area and an individual size of between 20.5 and 22.5 g. Time spent in raceway one may be approximately one to two months. At the end of the time spent in raceway four, in some embodiments the shrimp may be partially harvested and removed from the aquaculture process.

Shrimp may then be moved to raceway five and grown for three to eight weeks until the biomass is between 1 and 5 kg/m$^2$ of bottom 30 surface area. The final shrimp individual size may be between 23.5 and 33.5 g. In one specific embodiment show in FIG. 3, the shrimp may have a biomass of 1 to 5 kg/m$^2$ bottom 30 surface area and an individual size of between 27 and 29 g. Time spent in raceway one may be approximately one to two months. At the end of the time spent in raceway five, all of the shrimp may be harvested and removed from the aquaculture process.

In another embodiment, shrimp may enter the first raceway at a size where there are 40-41 shrimp per pound and leave at a size where they are 21-25 shrimp per pound.

When transferring shrimp between raceways, all of the shrimp may be transferred or only a partial transfer may occur. For instance, in the above example, all shrimp may be transferred when shrimp are moved from raceway one to raceway two and from raceway two to raceway three, but only portion of the shrimp may be transferred when moved from raceway three to raceway four and from raceway four to raceway five. All shrimp may again be removed when recovered from raceway five. Whenever partial transfers are made, in some embodiments shrimp to be transferred may be selected by size.

Raceways may be arranged as shown in FIG. 3, or they may be arranged in cyclical opposition to each other to allow synchronous growth.

According to a more particular embodiment, the raceways may have dimensions appropriate for the size shrimp they are intended to accommodate. One such example raceway is shown in FIG. 2. In FIG. 2, the first and second raceways may have a side wall depth 200 of 5 cm and an internal depth 210 of 8 cm at the shallow end and a side wall depth 220 of 9 cm and an internal depth 230 of 12 cm at the deep end. The average side wall depth may be between 3 cm and 14 cm. In this example raceways one and two are a combined raceway with an internal divider 170 (FIG. 3) and the raceway one portion located at the shallow end. However, raceways one and two might also be separate raceways, with raceway one having dimensions similar to the shallow end and raceway two having dimensions similar to the deep end. The first and second raceways may, in some embodiments, be designed to hold shrimp between 1 mg and 2 g in size and may have an average depth of 5 cm.

The third raceway may have a side wall depth 240 of 8 cm and an internal depth 250 of 11 cm at the shallow end and a side wall depth 260 of 12 cm and an internal depth 270 of 15 cm at the deep end. The average side wall depth may be between 7 cm and 22 cm. This raceway in one example may hold shrimp between 1 g to 8 g in size and have an average depth of 9 cm. The fourth raceway may have a side wall depth 280 of 11 cm and an internal depth 290 of 14 cm at the shallow end and a side wall depth 300 of 15 cm and an internal depth 310 of 18 cm at the deep end. The average side wall depth may be between 11 cm and 30 cm. This raceway in one example may hold shrimp between 7 g to 20 g in size and have an average depth of 13 cm. The fifth raceway may have a side wall depth 320 of 14 cm and an internal depth 330 of 17 cm at the shallow end and a side wall depth 340 of 18 cm and an internal depth 350 of 21 cm at the deep end. The average side wall depth may be between 15 cm and 38 cm. This raceway in one example may hold shrimp between 15 g to 40 g in size and have an average depth of 17 cm. In this example of FIG. 2, the raceways are 2 m wide.

Raceways according to the current disclosure may be arranged in any manner suitable for the space in which they are located, but in particular embodiments they may be arranged to minimize use of floor or ground space. For example, the raceways may be stacked on top of one another. Stacking raceways may minimize required floor space and may also have other benefits, such as helping to prevent shrimp from jumping out of the raceways. In general, shrimp do not require light for growth, so raceways in some embodiments maybe placed in configurations without regard for light availability. Freeboards and other structures may be used to hold the raceways in place. In one example embodiment, the distance between stacked raceways may be between 80 cm and 110 cm.

In one example configuration, shown in FIGS. 2 and 3, sets of four raceways may be stacked on top of one another. Each of raceways may have a width of 2 meters and a length of 40 meters. The raceways may be placed on top of one another, with a combined raceway one and two 100 at the top of the stack. Raceway three 110 may be next lowest, raceway four 120 may be below raceway three and raceway five 130 may be at the bottom of the stack. In the example shown, each raceway is 95 cm above the raceway below. Freeboard 140 may be used to help hold the raceways in place. In some embodiments freeboard 140 may be between 2 and 10 cm tall, more particularly it may be 5 cm tall. Although FIGS. 2 and 3 show stacks four troughs high, other numbers of troughs may be stacked. For example, trough stacks may be between two and ten troughs high.

Raceways of the present disclosure may be used with any type of water maintenance or circulation system. However, in a particular embodiment, raceways may be generally arranged so that the shallow end is the water intake end, i.e. where water enters or is added to the raceway, and the deep end is the water discharge end, i.e. where water exits the raceway. Particular systems that may be used with the raceways of the current disclosure include recirculating systems, reduced to zero water exchange systems, and flow-through systems. Although in many embodiments the same type of system may be used for each raceway/stage of the system of method, it is possible to use different water systems for different raceways or to use combinations of different systems, e.g. at different times, with each raceway. The amount of water used in each type of system varies. For example, a flow-through system may pump water from a natural source and thus use high volumes of water in total. One of ordinary skill in the art will understand that the water volumes cited throughout this specification may refer to total water used or to total water present in the raceways at a given point in time depending largely on the recirculation system in place. According to a particular embodiment, for any one raceway or the system overall, between 0 and 1000% of the total water volume of the raceway may be exchanged per day.

Water may be moved from one raceway to another in connection with and to facilitate transfer of shrimp from one raceway to the next. This method may be particularly useful when raceways are stacked and water can simply move from an upper raceway to a lower one by gravity. In one embodiment, raceways combining two or more stages, such as the combined raceway one and raceway two described above, may have removable partition or a partition containing a portal to allow flow of water from earlier stages to later stages.

In one embodiment, at least one raceway may contain a pump for water circulation. In another embodiment, at least one raceway may contain a pit, particularly a pit at one end, from which water may be drained. The pit may also be used for harvesting the shrimp. In some embodiments, water may be added to one end of a raceway and removed from the other end. In still another embodiment, at least one water circulation system may use intakes or outlets located along the raceway sides in addition to or in place of intakes or outlets at and end of the raceway.

In selected embodiments, water may flow through the raceways along their lengths. Water may also be circulated clockwise or counterclockwise within the raceways. In some systems, certain of the raceways may have flow or circulation or combinations of both and some may not. In one particular embodiment, bottom apex 40b may be higher than junctions 50 to provide uniform velocity of circular water circulation across the raceway.

Particular embodiments of the raceway system may also contain waste removal elements. For example, the raceways may contain pits at the end for waste collection. In some systems, waste removal elements may be included for some raceways and not others.

In certain embodiments of the disclosure, water quality in each trough may be maintained within set parameters. Example parameters are given in Table 1. While these example water quality parameters are expected to work well with the system of FIGS. 2 and 3, adjustments may be made for different systems.

TABLE 1

| Water Quality | | | |
| --- | --- | --- | --- |
| Optimum | Typical | Minimum | |
| 26 ppt | 15 ppt | 0.5 ppt | Salinity |
| 30 + 1 | 30 + 1 | 30 + 1 | Temperature ° C. |
| >4 ppm | >4 ppm | >4 ppm | Dissolved Oxygen |

TABLE 1-continued

Water Quality

| Optimum | Typical | Minimum | |
|---|---|---|---|
| <0.5 ppm | <0.5 ppm | <0.5 ppm | TAN (total ammonia nitrogen) |
| <0.5 ppm | <0.4 ppm | <0.1 ppm | $NO_2$ |
| <5.0 ppm | <5.0 ppm | <4.0 ppm | $NO_3$ |
| 7.8-8.4 | 7.8 to 8.4 | 7.8 to 8.4 | pH |

Overall, salinity and other conditions may be adjusted to achieve various goals, such as economic viability, for the aquaculture system. For example, inland, where salt water is not readily available, it may be desirable to sacrifice shrimp growth rates or viability by using lower salinity due to costs of salt. Salt water or other water may be obtained directly from natural sources or from non-natural sources. Water from any source may be treated to improve its suitability for use in shrimp aquaculture. For example it may be filtered, such as biofiltered. In particular embodiments, salt water from any source with a salinity between 0.2 ppt and 45 ppt may be used.

Raceways of the current disclosure may also contain features to help prevent shrimp from jumping from the raceways or, particularly if located outside, to prevent other animals from accessing the shrimp. These features may be present on all raceways or a portion thereof, for example raceways with larger shrimp more able to jump out. One possible such feature is a cloth or plastic mesh barrier 150 on top of each raceway or between each raceway (if stacked) to inhibit shrimp from jumping out. Another possible such feature is a cloth or plastic mesh barrier 160 around all sides of the raceway to inhibit shrimp from jumping out. Some arrangements may use one or more different features. For example, in the stacked arrangement shown in FIG. 3, there may be a barrier 150 above combined raceways one and two a barrier 170 around all sides of the lower raceways.

Raceways of the current disclosure may be made of any suitable material or combinations of materials. For example, side walls 20 and sloped bottom 30 as well as end walls 10 of the raceway may be made of one or more of the following: fiberglass, cement, wood with plastic liners, and the like. Materials may be selected based on at least cost or size of the raceway. For example, more structurally sound materials may be used for larger raceways, even if more costly.

Using the systems and methods described herein, shrimp may be produced in an amount of 7 to 70 kg/m³/crop. Up to 18 crops per year may be grown with some systems. Survival rate (% of shrimp initially stocked that are later harvested) may be between 70% and 98%. Growth rates may be between 1.3 and 3.0 g/week. Feed conversion ratios may be as low as 1.0 to 1.6. Shrimp may grow as large at 18 to 35 g/shrimp, depending on the time of harvest. Each of these results may be achieved using an average water depth for all raceways of 30 cm or less, more particularly 20 cm or less.

In general trade-offs between various desirable features may be made as needed. For example, there is typically a trade-off between stocking density and growth rate. Stocking density may be decreased in many situations to achieve higher growth rate, which is typically more determinative the economic viability of aquaculture. Lower stocking density may also improve viability.

Although raceways may be stacked to obtain advantages in area required for shrimp farming, unstacked raceways may also benefit from the other raceway features described herein. For example, unstacked raceways may benefit from low average water depth and low water volume.

The shrimp aquaculture system and methods of the current disclosure may be used to produce shrimp for any purpose. However, four particular shrimp farming purposes to which the system and method are suited include: a) production of shrimp for human consumption, b) production of bait shrimp, c) nursery phase production for stocking pond production, and d) production of broodstock. The stage of growth and hence the raceway/stage at which shrimp are harvested may vary depending in the end use of the shrimp. For example, shrimp intended for stocking pond production may not need to reach the sizes described above in some examples for later raceways, such as raceways four and five. In particular embodiments, shrimp may be partially harvested at one or more growth stages.

The shrimp aquaculture system and methods may be used in any climate or geographic region. In particular embodiments, it may be used in a climate or geographic region in which the temperature is below 26° C. for more than one month of the year, or which is otherwise unsuitable for year-round shrimp aquaculture. The system and methods may be used under climate-controlled conditions in such locations. For example the system and methods may be used in an enclosed or partially enclosed structure such as a greenhouse or warehouse. In such uses, stacked raceways may be particularly beneficial as they may reduce the total infrastructure and climate control costs.

EXAMPLES

The present disclosure may be better understood through reference to the following examples. These examples are included to describe exemplary embodiments only and should not be interpreted to encompass the entire breadth of the invention.

Example 1

Effect of Depth on Growth and Survival of Juvenile *Litopenaeus vannamei* in 4' Outside Tanks at 100 Shrimp/m²

Sixty prototype tanks located outdoors were used to test the ability of shrimp to grow in low water depths such as may be found in embodiments of the current disclosure. Shrimp were variety PL 07-03. Other marine shrimp may also be used in embodiments of the current disclosure. For example, *L. vannamei* is only one of about 200 shrimp species. Although it accounts for approximately 60% of current commercial shrimp production, black tiger shrimp account for another 20-30% of commercial shrimp production and approximately eight other species account for the remaining 0.01-10% of commercial shrimp production. One of ordinary skill in the art, using the tests and results from these experiments with *L. vannamei* and other portions of the disclosure, may adapt the aquaculture systems and methods for use with other shrimp species, particularly the other commercial shrimp species.

Shrimp were grown for a total of eight weeks. No recirculation was used. Water was exchanged with filtered seawater from the Port Aransas Channel daily for 8 hours at a rate of 0.5 gallons per minute. This resulted in an exchange volume of 240 gallon/tank/day and 14,400 gallons/day for the sixty tank system. Water exchange amounts for tanks with different water depths are shown in Table 2.

TABLE 2

Water exchange

| Depth (cm) | Exchange (gal/tank/day) | Volume (gal/tank) | Percentage (%/day) |
|---|---|---|---|
| 10 | 240 | 31 | 774 |
| 20 | 240 | 62 | 387 |
| 40 | 240 | 124 | 194 |
| 60 | 240 | 185 | 130 |
| 80 | 240 | 247 | 97 |
| 100 | 240 | 309 | 78 |
| 120 | 240 | 371 | 65 |
| 140 | 240 | 433 | 55 |

Each culture tank has a radius of 0.61 m and a bottom area of 1.17 m$^2$. The depths and volumes of each tank are listed in Table 3.

TABLE 3

Tank volumes

| Depth (cm) | Volume m$^3$ | L | gal |
|---|---|---|---|
| 10 | 0.12 | 117 | 31 |
| 20 | 0.23 | 234 | 62 |
| 40 | 0.47 | 468 | 124 |
| 60 | 0.70 | 702 | 185 |
| 80 | 0.94 | 936 | 247 |
| 100 | 1.17 | 1170 | 309 |
| 120 | 1.40 | 1404 | 371 |
| 140 | 1.64 | 1638 | 433 |

Tanks were aerated using two 1.5"*1.5"*1.5" air stones per tank. The location and number of air stones for each tank is provided in Table 4.

TABLE 4

Number and location of air stones

| Water depth (cm) | 40 cm above bottom in 3" air lift | 20 cm above bottom | 10 cm above bottom | 5 cm above bottom |
|---|---|---|---|---|
| 10 | 0 | 0 | 0 | 2 |
| 20 | 0 | 0 | 2 | 0 |
| 40 | 0 | 2 | 0 | 0 |
| 60 | 0 | 2 | 0 | 0 |
| 80 | 1 | 1 | 0 | 0 |
| 100 | 1 | 1 | 0 | 0 |
| 120 | 2 | 0 | 0 | 0 |
| 140 | 2 | 0 | 0 | 0 |

Salinity was not regulated, but was between 25-40 ppt. Temperature was also not regulated but was between 26 and 32° C. Tanks were located outdoors in full sun.

Throughout the experiment shrimp were fed Rangen 45/10 commercial feed (Rangen, Inc., Angleton, Tex.). Shrimp were fed three times per day manually according to the schedule in Table 5.

TABLE 5

Feeding schedule, percentage of daily total

| Temperature | 8 AM | 11:50 AM | 4:30 PM |
|---|---|---|---|
| 25° C. and above | 33.3% | 33.3% | 33.3% |
| 23-24° C. | 33.3% | 0% | 33% |
| below 23° C. | 0% | 33.3% | 0% |

Shrimp were fed at a rate of 2.0 g/shrimp/week or 0.29 g/shrimp/day. Specific details regarding feeding are in Table 6. Each column in Table 6 represents the test results of a different test sample. A total of four test samples were used to determine the effect of feed rate on production.

TABLE 6

Feed rate in g

| Feed/shrimp/week (g) | 1.5 | 2.0 | 2.5 | 3.0 |
|---|---|---|---|---|
| Feed/shrimp/day (g) | 0.21 | 0.29 | 0.36 | 0.43 |
| Feed/shrimp/feeding (g) | 0.071 | 0.095 | 0.119 | 0.143 |
| Feed/100 shrimp/m2/feeding (g) | 8.36 | 11.14 | 13.93 | 16.71 |

Shrimp were fed 11.14 g/tank/feeding. The total amount of feed needed is shown in Table 7. Uneaten feed and dead shrimp were not removed.

TABLE 7

Amount of feed needed for a maximum of eight weeks

| Density (shrimp/m2) | 100 |
|---|---|
| Shrimp/tank | 117 |
| Feed/shrimp/week (g) | 2.5 |
| Number of weeks | 8 |
| Number of tanks | 60 |
| Total feed needed for trial (kg) | 140 |
| Total feed needed for trial (lb) | 309 |

A total of 7020 shrimp were used in the experiments. Water depth in the experiment and stocking density as well as growth throughout the experiment are provided in Table 8.

TABLE 8

Stocking density and growth

| Depth (cm) | Density Shrimp /tank | /m$^2$ | /m$^3$ | Size (g) Initial | Final | Final biomass (g) /tank | /m$^2$ | /m$^3$ |
|---|---|---|---|---|---|---|---|---|
| 10 | 117 | 100 | 1000 | 6.0 | 18.0 | 2111 | 1804 | 18040 |
| 20 | 117 | 100 | 500 | 6.0 | 18.0 | 2111 | 1804 | 9020 |
| 40 | 117 | 100 | 250 | 6.0 | 18.0 | 2111 | 1804 | 4510 |
| 60 | 117 | 100 | 167 | 6.0 | 18.0 | 2111 | 1804 | 3007 |
| 80 | 117 | 100 | 125 | 6.0 | 18.0 | 2111 | 1804 | 2255 |
| 100 | 117 | 100 | 100 | 6.0 | 18.0 | 2111 | 1804 | 1804 |
| 120 | 117 | 100 | 83 | 6.0 | 18.0 | 2111 | 1804 | 1503 |
| 140 | 117 | 100 | 71 | 6.0 | 18.0 | 2111 | 1804 | 1289 |

The results in Table 8 show that the final amount of shrimp obtained per m$^3$ of water is much higher at lower tank depths.

Other results from the experiments described above or similar experiments were tabulated and presented in FIGS. 4-10.

Figure 4:
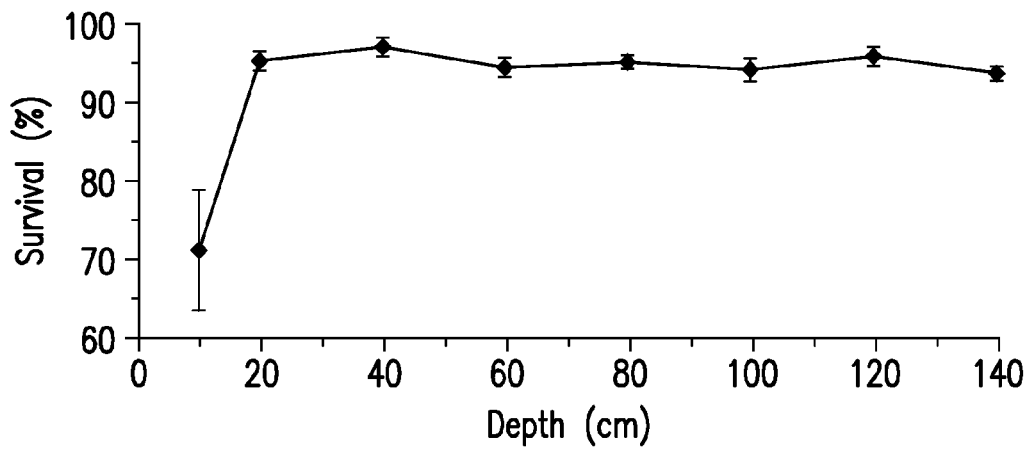
FIG. 4 illustrates the effect of water depth on shrimp survival. Values represent mean ± standard error for 8 replicates except for depth of 10 cm which had 4 replicates.

FIG. 4 shows the effect of water depth on survival. Shrimp showed acceptable survival rates even in 10 cm water and at 20 cm survival rates were comparable to much greater water depths.

Figure 5:
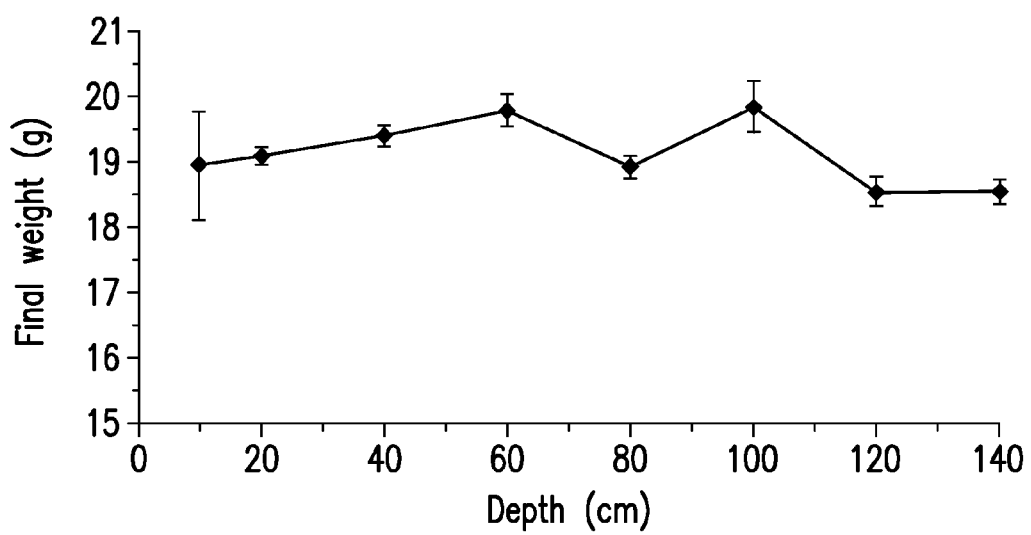
FIG. 5 illustrates the effect of water depth on final shrimp weight. Values represent mean ± standard error for 8 replicates except for depth of 10 cm which had 4 replicates.

FIG. 5 shows the effect of water depth on final shrimp weights. Even at a water depth to 10 cm, final shrimp weights were comparable to that achieved with much greater water depths.

Figure 6:
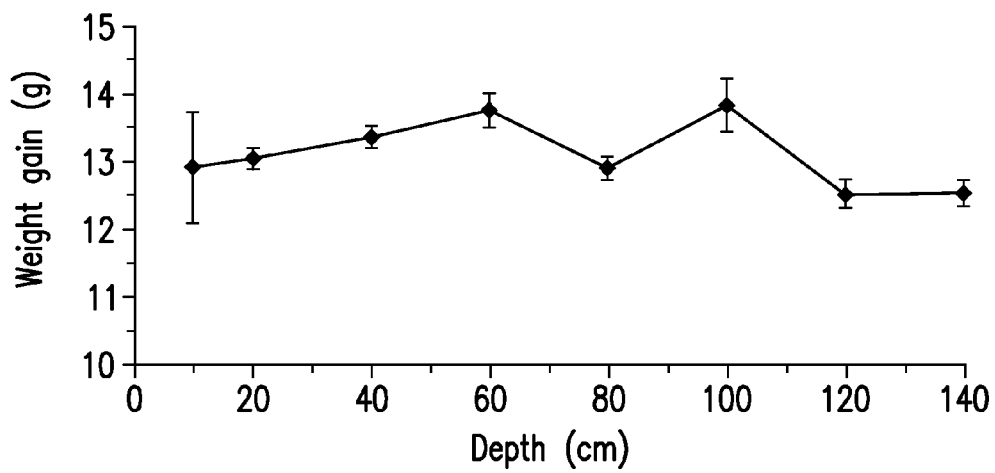
FIG. 6 illustrates the effect of water depth on shrimp weight gain. Values represent mean ± standard error for 8 replicates except for depth of 10 cm which had 4 replicates.

FIG. 6 shows the effect of water depth on shrimp weight gain. Weight gain was also similar at a depth of 10 cm to that achieved at much higher depths.

Figure 7:
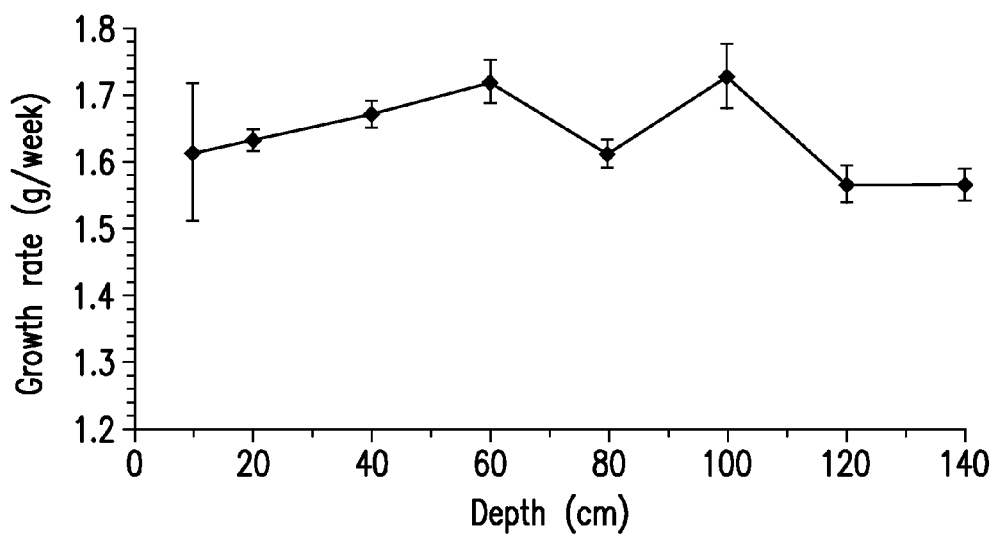
FIG. 7 illustrates the effect of water depth on shrimp growth rates. Values represent mean ± standard error for 8 replicates, except for depth of 10 cm which had 4 replicates.

FIG. 7 shows the effect of water depth on shrimp growth rate. Growth rates at 10 cm were similar to higher water depths and actually better than growth rates at the highest tested water depths.

Figure 8:
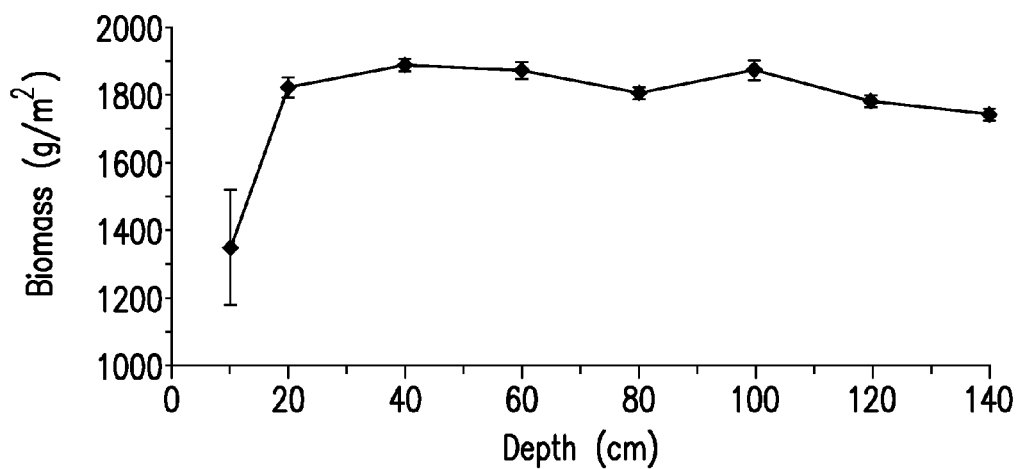
FIG. 8 illustrates the effect of water depth on shrimp biomass per square meter of tank bottom. Values represent mean ± standard error for 8 replicates except for depth of 10 cm which had 4 replicates.

FIG. 8 shows the effect of water depth on biomass per m² of tank bottom. Water depths of 10 cm showed acceptable biomass levels and at water depths of 20 cm biomass levels were comparable to that achieved at higher water depths.

Figure 9:
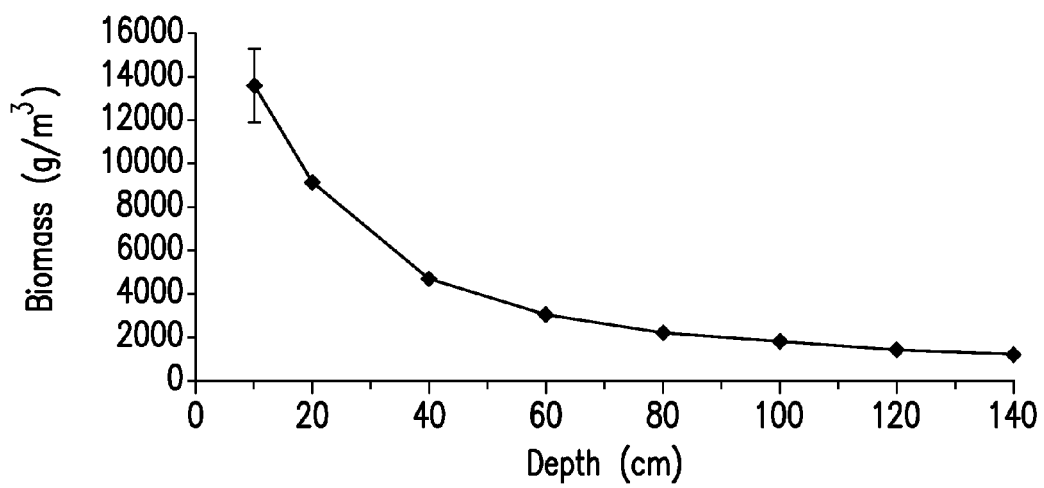
FIG. 9 illustrates the effect of water depth on shrimp biomass per cubic meter of water used to grow the shrimp. Values represent mean ± standard error for 8 replicates except for depth of 10 cm which had 4 replicates.

FIG. 9 shows the effect of water depth on biomass per m³ of water used to grow the shrimp. Water depths of 10 cm and even 20 cm showed markedly higher biomass per m³ of water than higher water depths.

Figure 10:
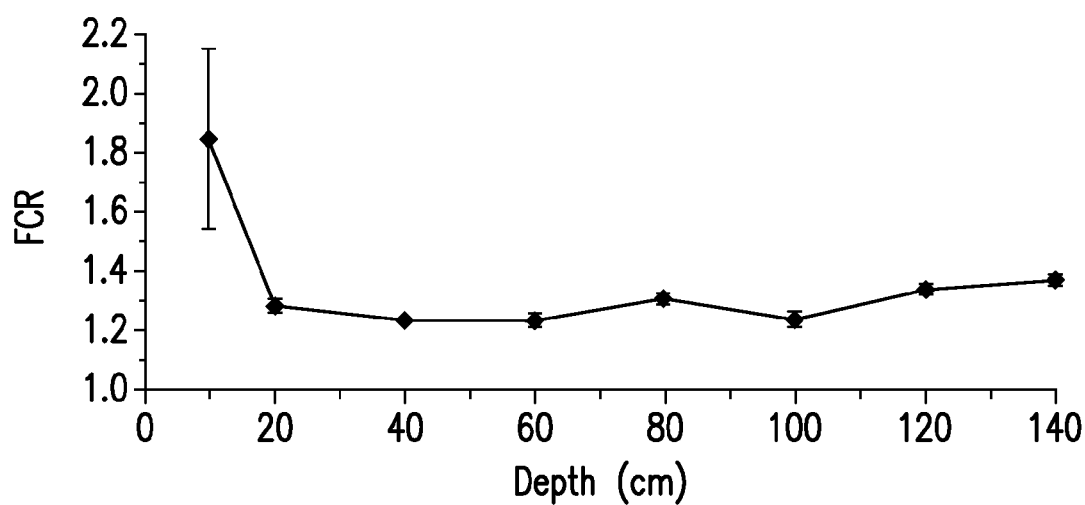
FIG. 10 illustrates the effect of water depth on feed conversion. Values represent mean ± standard error for 8 replicates except for depth of 10 cm which had 4 replicates.

FIG. 10 shows the effect of water depth on feed conversion rate (FCR). FCR is much higher at a water depth of 10 cm than even at 20 cm.

Example 2

Effect of Feed Rate and High Stocking Density on Growth and Survival of *L. Vannamei* in an Outdoor Tank System with 20 cm Water Depth Experimental Methods PL 09-01 shrimp were used and fed Zeigler Feed (ZB ID:High Intensity Shrimp GER, 327293-33-86, SMP # ZBO9-121). Shrimp stocking density with estimated shrimp initial and final size, maximum biomass (g) and density (g/m³) are provided in Table 9.

TABLE 9

Stocking density with estimated shrimp size, maximum biomass, and density

| Density | | | Estimated values (g) | | | |
|---|---|---|---|---|---|---|
| Shrimp/tank | Shrimp/m² | Shrimp/m³ | Initial size | Max size | Max final Biomass/tank | Max density (/m³) |
| 154 | 132 | 658 | 6.0 | 17.0 | 2618 | 11188 |
| 260 | 222 | 1111 | 6.0 | 17.0 | 4420 | 18889 |
| 375 | 320 | 1602 | 6.0 | 17.0 | 6375 | 27243 |

The number of shrimp needed to obtain various densities is shown in Table 10.

TABLE 10

Number of Shrimp

| /tank | Number of tanks | Total/density |
|---|---|---|
| 154 | 20 | 3080 |
| 260 | 20 | 5200 |
| 375 | 20 | 7500 |
| Total number | | 15780 |

No recirculation was used. Water was filtered seawater from the Port Aransas Channel. Water was exchanged on a 24 hour basis using a booster pump. Water exchange parameters for days 1-35 are shown in Table 11. Water exchange parameters for day 36 were changed due to higher mortality and on are show in Table 12.

TABLE 11

Water Exchange Parameters Days 1-35

| Flow GPM | Flow/tk (Ga/day) | Flow/20tk (Ga/day) | Tank vol (Ga) | Ex/tk (%/day) | shrimp #/tk | Ex/shrimp (%/shrimp/d) |
|---|---|---|---|---|---|---|
| 0.15 | 216 | 4320 | 62 | 348.4 | 154 | 2.26 |
| 0.25 | 360 | 7200 | 62 | 580.6 | 260 | 2.23 |
| 0.5 | 720 | 14400 | 62 | 1161.3 | 375 | 3.10 |

TABLE 12

Water Exchange Parameters Days 36+

| Flow GPM | Flow/tk (Ga/day) | Flow/20tk (Ga/day) | Tank vol (Ga) | Ex/tk (%/day) | shrimp #/tk | Ex/shrimp (%/shrimp/d) |
|---|---|---|---|---|---|---|
| 0.25 | 216 | 7200 | 62 | 580.6 | 154 | 3.77 |
| 0.50 | 720 | 14400 | 62 | 1161.3 | 260 | 4.47 |
| 0.50 | 720 | 14400 | 62 | 1161.3 | 375 | 3.10 |

Ga = gallons

An O 1-2 culture system was used. Culture tanks had a radius of 0.61 m, a bottom area of 1.17 m², a depth of 0.20 m, and a volume of 230 L. Tanks were aerated using two 1.5 inch×1.5 inc×1.5 inch air stones per tank with the stones located 5 cm above the bottom of the tank. Salinity was not regulated, but was expected to be between 25-40 ppt. The temperature was not regulated. Tanks were located outside in the full sun.

Shrimp were fed manually three times per day according to the schedule in Table 13.

TABLE 13

Feeding Schedule: Percentage of Daily Total

| Temperature (° C.) | 8:30 AM | 01:00 PM | 4:30 PM |
|---|---|---|---|
| 25 and above | 33% | 33% | 33% |
| 23-24 | 33% | 0% | 33% |
| 20-22 | 0% | 33% | 0% |
| below 20 | 0% | 0% | 0% |

Shrimp were assumed to grow at a rate of 1.2 g/week on average and thus were fed at the rate indicated in Table 14.

TABLE 14

Shrimp Feed Rate Per Week

| | Feed Rate (g/shrimp) | | | |
|---|---|---|---|---|
| Feed/shrimp/10 weeks | 10 | 15 | 20 | 25 |
| Feed/shrimp/week | 1.0 | 1.5 | 2.0 | 2.5 |
| Feed/shrimp/day | 0.14 | 0.21 | 0.29 | 0.36 |
| Feed/shrimp/feeding | 0.048 | 0.071 | 0.095 | 0.119 |
| Feed/154shrimp//feeding | 9 | 13 | 18 | 22 |
| Feed/260shrimp/feeding | 15 | 22 | 30 | 37 |
| Feed/375 shrimp/feeding | 22 | 32 | 43 | 54 |

Dead shrimp and uneaten feed were removed. Dead shrimp were replaced for the first two days.

Tanks with excessive molts were scooped beginning at day 22 to avoid clogging water systems.

Water temperature, DO and salinity were monitored daily and daily maximum and minimum temperature was logged. Ammonia (total ammonia nitrogen, TAN), nitrite, nitrate and pH were monitored weekly. An algae count was performed bi-weekly.

Growth and survival data was analyzed with stocking density and feed rate (FR) as independent variables. The system was a blocking factor. Dependent variables included survival, final weight, weight gain per shrimp per tank, growth (g/week), biomass (g/m³), and feed conversion (FCR). Two way-ANOVA transformations were performed as follows:

| Variable | Transformation |
|---|---|
| Final Weight | log of Final Weight |
| Weight Gain | log of Weight Gain |
| Survival | Arcsine of Survival |

Hydrological and Water Quality

During Example 2, temperature (as recorded by min/max thermometer) ranged from 22.0 to 36.9° C., and salinity from 21.6 to 38.8 ppt. Table 15 summarizes the mean values of tank morning DOs and temperatures, and weekly water quality parameters.

TABLE 15

Water Quality and Hydrological Parameters

| | DO, AM (mg/L) | Temp, AM °C. | pH | TAN | Nitrite (mg/L) | Nitrate |
|---|---|---|---|---|---|---|
| Mean | 4.9 | 27.7 | | 0.822 | 0.01 | 0.034 |
| Min | 1.2 | 25.8 | 7.29 | 0.106 | 0.003 | 0.005 |
| Max | 6.7 | 30.8 | 7.97 | 3.74 | 0.61 | 0.092 |

Average total ammonia nitrogen (TAN) values for treatments ranged from 0.39 to 1.86 ppm, nitrite from 0.006 to 0.011 ppm, and nitrate from 0.025 to 0.052 ppm. Results of a two-way ANOVA indicated that the differences in TAN values due to density and feed rate were significant. However, differences in TAN values due to interaction of density and feed rate were not significant. With 2.11 ppm, the TAN value is significantly higher at density $1602/m^3$ than the lower densities (0.54 and 0.66 ppm for 658 and $1111/m^3$ respectively). Difference in mean TAN levels between densities of $658/m^3$ and $1111/m^3$ was not significant. Also, significantly high levels of TAN were observed at feed rate 2.5 g/shrimp/wk (1.14 ppm). However, differences in TAN levels below feed rate of 2.5 g/shrimp/wk were not significant. The differences in nitrite and nitrate levels due to density, feed rate, and interaction of density and feed rate were not significant. Mean values of nitrite remained below critical limit (range: 0.005 and 0.061 ppm). Nitrate levels ranged from 0.01 and 0.087 ppm in the trial. Levels of daily tank pH ranged from 7.29 to 7.97. High levels of TAN at density $1602/m^3$ and at feed rate 2.5 g/shrimp/wk may have affected growth and survival. The observed levels of nitrite and nitrate did not appear to have appreciable impact on growth and survival under the conditions of Example 2. FIGS. 11 through 18 illustrate the survival, final weight, growth, biomass, and feed conversion (FCR) values from the growth trial. At the end of the 52 day trial, shrimp survival ranged from 57.5% ($1602/m^3$ and at 1.5 g/shrimp/wk feed rate) to 99.1% ($658/m^3$ and 2.0 g/shrimp/wk feed rate) with final weights from 14.1 g ($658/m^3$, and 1.0 g/shrimp/wk feed rate) to 24.4 g ($658/m^3$, 2.5 g/shrimp/wk feed rate). Average weekly growth remained between 0.85 g ($1111/m^3$, 1.0 FR) and 2.42 g ($658/m^3$ and 2.5 FR).

Survival

Figure 11:
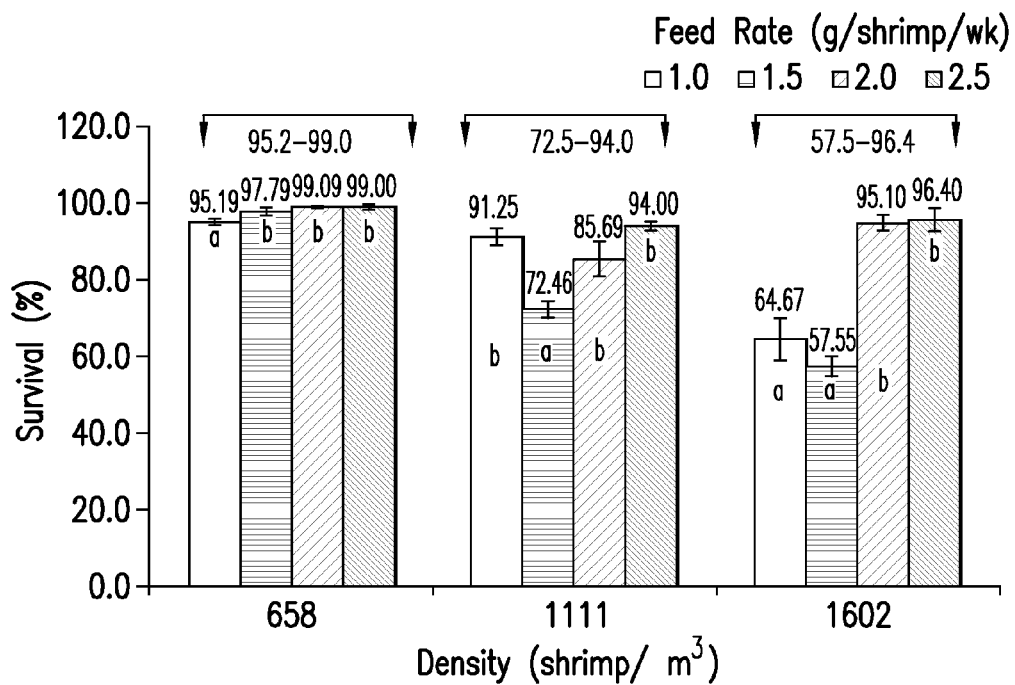
FIG. 11 illustrates the effect of feed rate and density on survival. Values represent mean ± standard error for 4-5 replicates.
Figure 12:
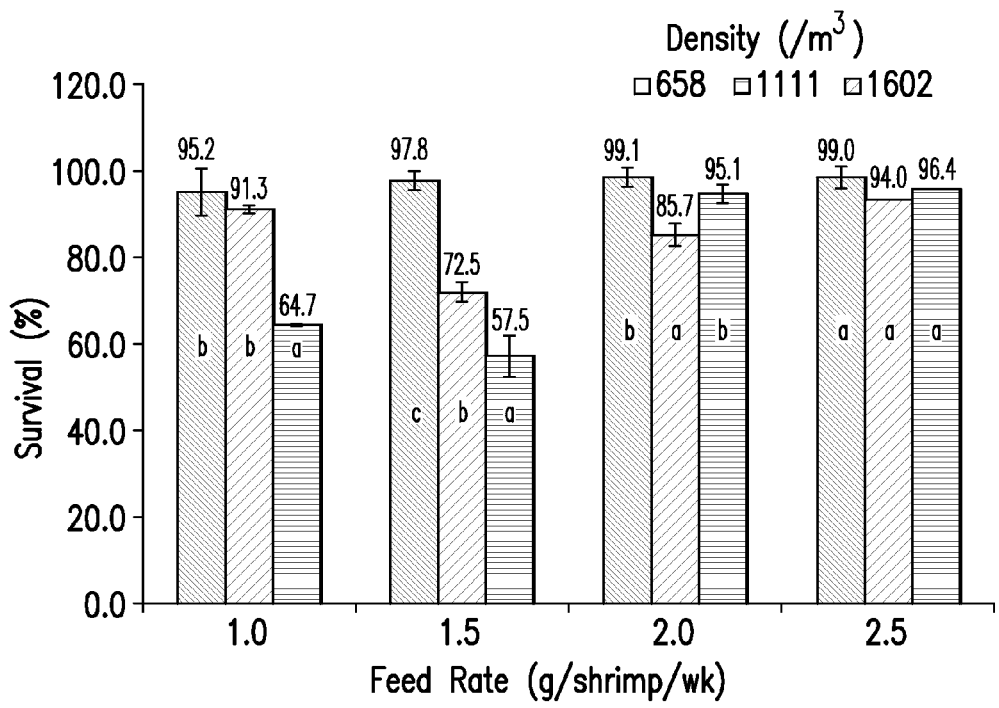
FIG. 12 illustrates the effect of feed rate and density on survival. Values represent mean ± standard error of means for 4-5 replicates.
Figure 13:
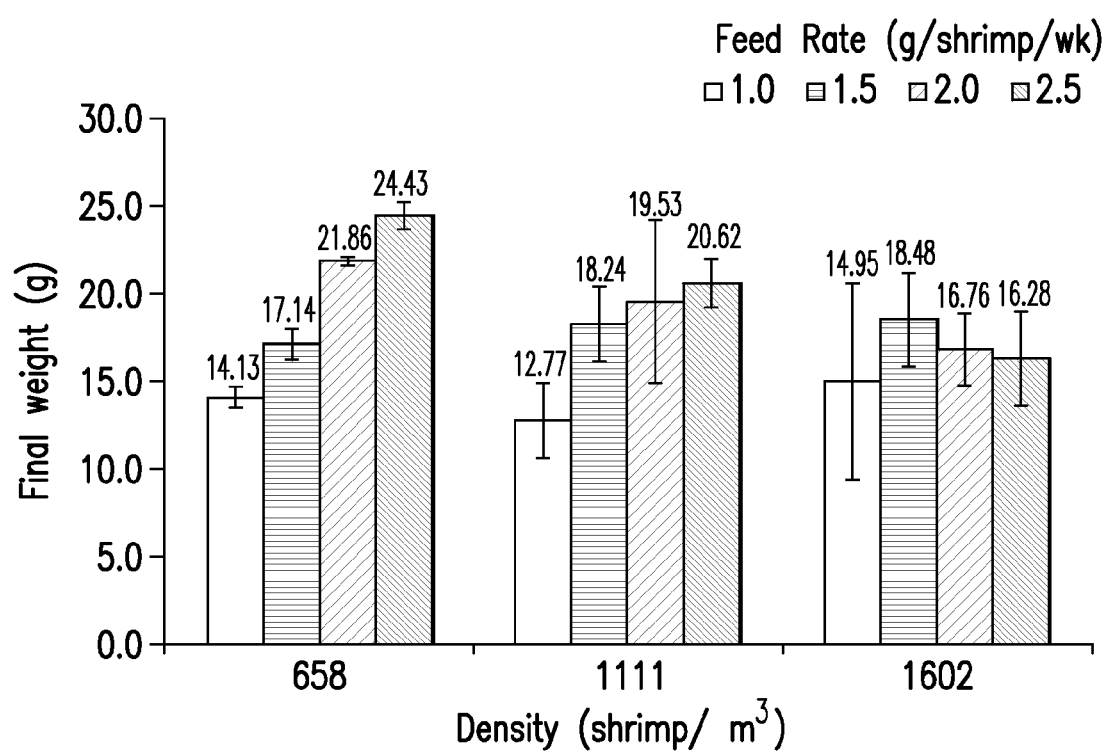
FIG. 13 illustrates the effect of feed rate and density on final weight. Values represent mean ± standard error of means for 4-5 replicates.

Results of two-way ANOVA indicated that the differences in shrimp survival due to density, feed rate, and interaction of density and feed rate were all significant. Results are shown in FIGS. 11 and 12. Results from one-way ANOVA for density indicated that, at density $658/m^3$, survival was significantly low at feed rate of 1.0 (95.2%) compared to survivals at feed rates above 1.0 (97.8%, 99.1%, and 99.9% for feed rates 1.5, 2.0, and 2.5 respectively). Differences in survivals above feed rate of 1.0 were not significant. While at density $1111/m^3$, survival (72.5%) was significantly low at feed rate 1.5 compared to the rest of the feed rates, survival was significantly high at feed rate above 1.5 at density $658/m^3$. However, survivals within two lower and two higher feed rates did not differ significantly. For feed rate, results of one-way ANOVA indicated that, at feed rate 1.0, difference in survivals in two lower densities were not significant. Also, lowest survival of 64.7% was observed at highest density of 1602/m3. At feed rate 1.5, significant decrease in survival was observed with density. At feed rate 2.0, lowest survival (85.7%) was at $1111/m^3$. Differences in survivals between densities $658/m^3$, and $1602/m^3$ were not significant. At feed rate 2.5, differences in survivals were not significant between any density treatments.

Survivals at the lowest density ranged from 95.2% to 99.9%, lowest survival being at feed rate 1.0. Considering the water depth to be only 20 cm, survivals from this lowest density are surprisingly high. Survival for density $1111/m^3$ ranged from 72.5% to 94.0%, lowest survival being at feed rate 1.5. Low survival at feed rate 1.5 could not be explained under the conditions of trial. Survival at the highest density ranged from 57.5% to 96.9% for stocking density $1602/m^3$. Although survivals at two low feed rates were lower (57.5% and 64.7%) compared to high feed rates (96.3% and 96.9% for 2.0 and 2.5), it is not believed that feed rate would contribute to difference in survival.

Higher survival above feed rate of 1.5 indicates that higher feed rates did not affect survival between different densities. Low survival values can be correlated to higher levels of ammonia, and high stocking density. In this trial, feed was not adjusted for mortality. Thus, the uneaten feed might be responsible for water quality conditions not suitable for optimal growth and survival.

Final Weight

Results of a two-way ANOVA indicated that the differences in final weights due to stocking density, feed rate, and interaction of density and feed rate were all significant. Results are presented in FIG. 13. Results of one-way ANOVA (for density) indicated that, final weights increased with feed rate for densities 658/m3, and $1111/m^3$. At highest density of $1602/m^3$, significantly higher final weight (18.5 g) was observed at feed rate 1.5. Differences in final weights for rest of the feed rates were not significant. One-way ANOVA (for feed rate) indicated that, final weights were highest for densities $658/m^3$ and $1602/m^3$ (14.1 g vs. 14.9 g) without any significant difference between them compared to 12.7 g for density $1111/m^3$. At feed rate 1.5, differences due to stocking density were not significant. At feed rate of 2.0 and 2.5, finals weights decreased with increasing density with differences being significant between them.

Growth

Figure 14:
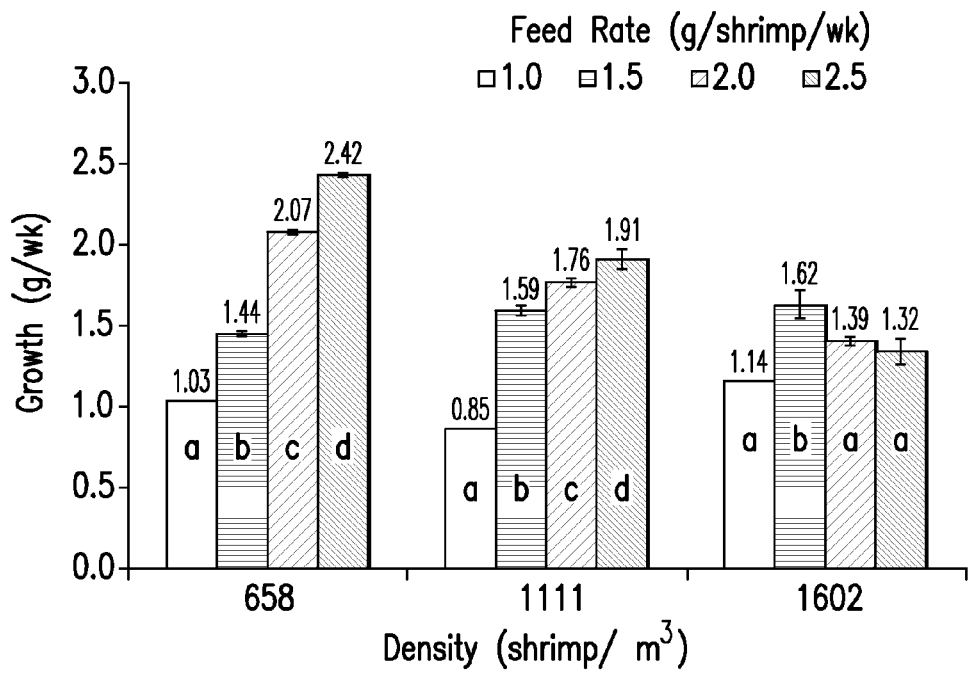
FIG. 14 illustrates the effect of feed rate and density on growth. Values represent mean ± standard error of means for 4-5 replicates.
Figure 15:
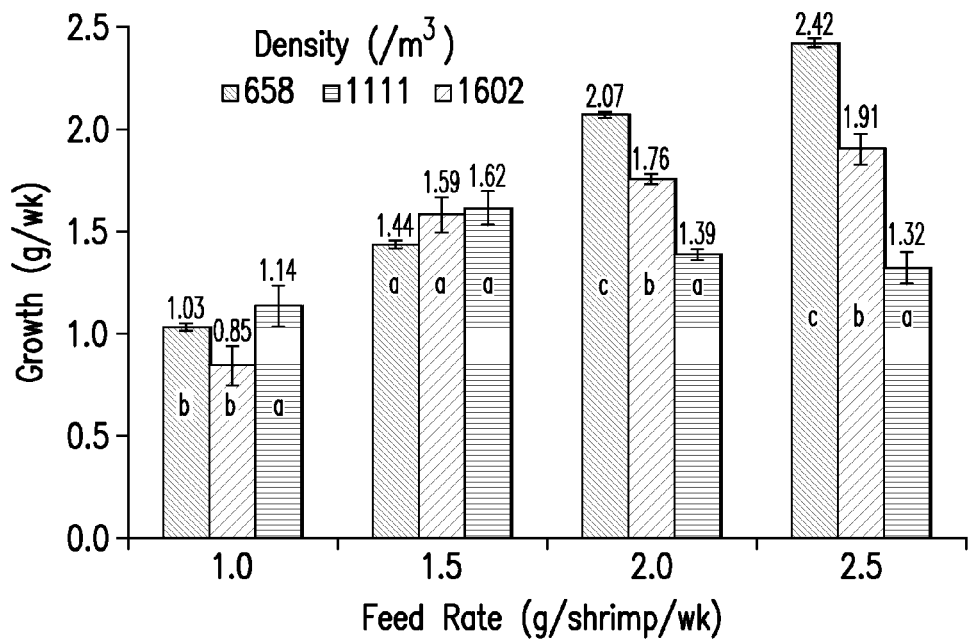
FIG. 15 illustrates the effect of feed rate and density on growth. Values represent mean ± standard error of means for 4-5 replicates.

Results of a two-way ANOVA indicated that the differences in weekly growth due to stocking density, feed rate, and interaction due to density and feed rate were significant. Results are shown in FIGS. 14 and 15. One-way ANOVA for density indicated that weekly growth increased with feed rate at densities $658/m^3$ (range: 1.03 to 2.42 g/wk) and $1111/m^3$ (range: 0.85 to 1.92 g/wk). At 1602/m3, lowest growth was observed at feed rate 1.0. Growth at feed rates 1.5 was significantly higher (1.62 g/wk) than growth at all feed rates, probably due to low survival (57%) in this treatment. Growth at feed rate 2.5 (1.32 g/wk) was at par with growth at feed rate 1.0 and 2.0 (1.14 and 1.39 g/wk). One-way ANOVA for feed rate indicated that, growth at feed rate 1.0 was significantly lower (0.85 g/wk) at density $1111/m^3$. Differences in growth between densities $658/m^3$ and $1602/m^3$ (1.03 vs. 1.14 g/wk) were not significant. Differences in growth between densities at feed rate 1.5 were not significant. Growth significantly increased with decreasing density at feed rates 2.0 and 2.5.

It is clear from the results that stocking density affected shrimp growth. Lowest density indicated higher growth. Also, growth appears to be directly proportional to feed rate at $658/m^3$ and $1111/m^3$. Feed rate of 2.5 stocked at $658/m^3$ and $111/m^3$ resulted in highest growth rate of 2.4 and 1.91 g/wk respectively under the conditions of experiment. Thus, at density of $658/m^3$, feed rate could likely be increased above 2.5. Although, a similar trend in growth values is indicated with density $1111/m^3$, growth at each feed rate is lower (range 0.85 to 1.90) than those observed at density $658/m^3$ (range 1.03 to 2.41) indicating a possibility of limiting feed rate at density $1111/m^3$ as well. Density effect was more appreciable in case of $1602/m^3$, wherein growth at all feed rates were at the same level (1.14 to 1.39 g/wk) except for feed rate of 1.5 (1.62 g/wk).

Biomass

Figure 16:
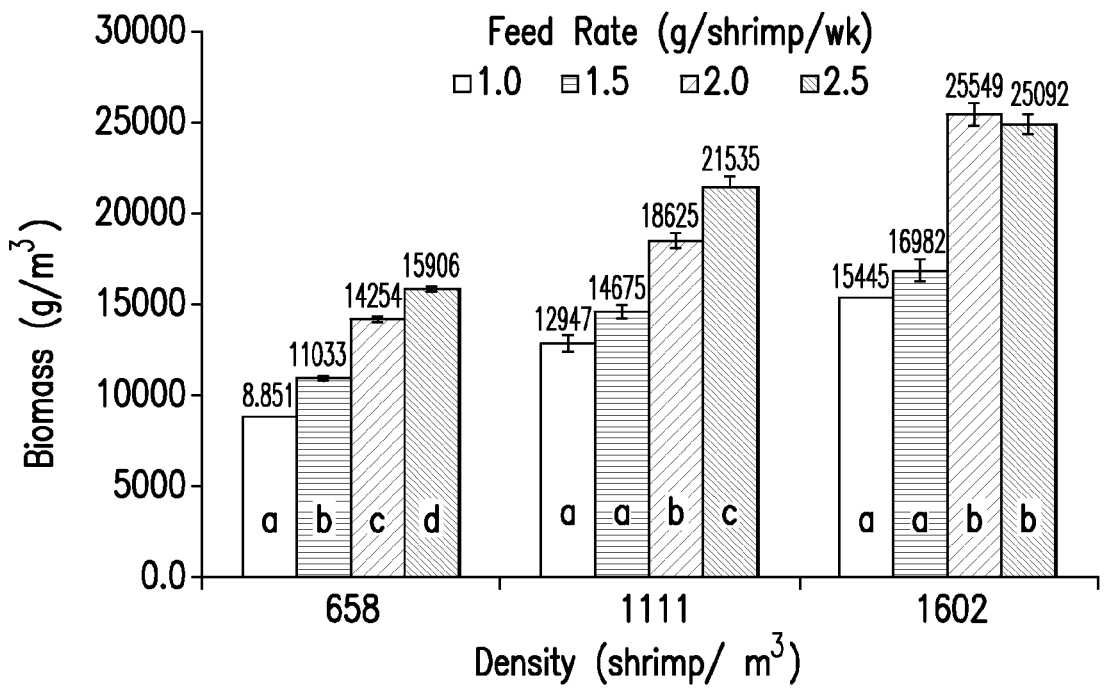
FIG. 16 illustrates the effect of feed rate and density on density. Values represent mean ± standard error of means for 4-5 replicates.

Results of two-way ANOVA indicated that the differences in biomass due to stocking density, feed rate, and their interactions were all significant ($P<0.05$). Results showing effects of stocking density are shown in FIG. 16. At density $658/m^3$, differences in biomass due to feed rate were significant ($P<0.5$). Biomass increased with feed rate. The lowest and highest biomass of $8851 g/m^3$ and $15906 g/m^3$ at feed rates of 1.0 and 2.5 g/shrimp/wk respectively indicated a possibility of limiting feed rate at 2.5 g/shrimp/wk. At density $1111/m^3$, difference in biomass at two lower feed rates (12947 and 14675 $g/m^3$) was not significant. However, feed rate of 2.0 indicated a significantly lower biomass (18625 $g/m^3$) due to low growth rate compared to a feed rate of 2.5 (21535 $g/m^3$). Higher biomass at feed rate 2.5 g/shrimp/wk may indicate a possibility of limiting feed rate at density $1111/m^3$. At density $1602/m^3$, biomass at two lower feed rates were significantly lower (15445 g and 16982 $g/m^3$) than the biomass at higher feed rates (25549 g and 25092 $g/m^3$), mostly due to high mortality and water quality issues from uneaten feed. The highest biomass was 25549 $g/m^3$ at feed rate 2.0 g/shrimp/wk. This high level of biomass under the conditions of the trial has not been reported elsewhere to the best of our knowledge. Due to high mortality at low feed rates, feed rate effect at density of $1602/m^3$ is not quite clear under the conditions of the trial. Biomass increase due to stocking density is obvious due to higher number of stocks at higher density.

Feed Conversion

Figure 17:
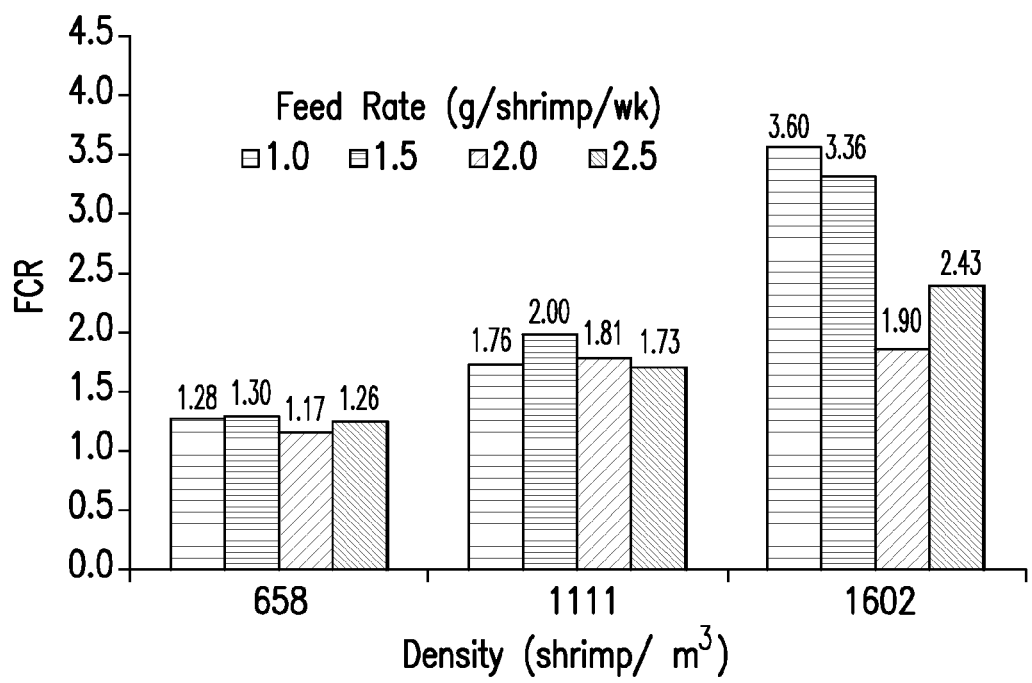
FIG. 17 illustrates the effect of feed rate and density on feed conversion. Values represent mean ± standard error of means for 4-5 replicates.
Figure 18:
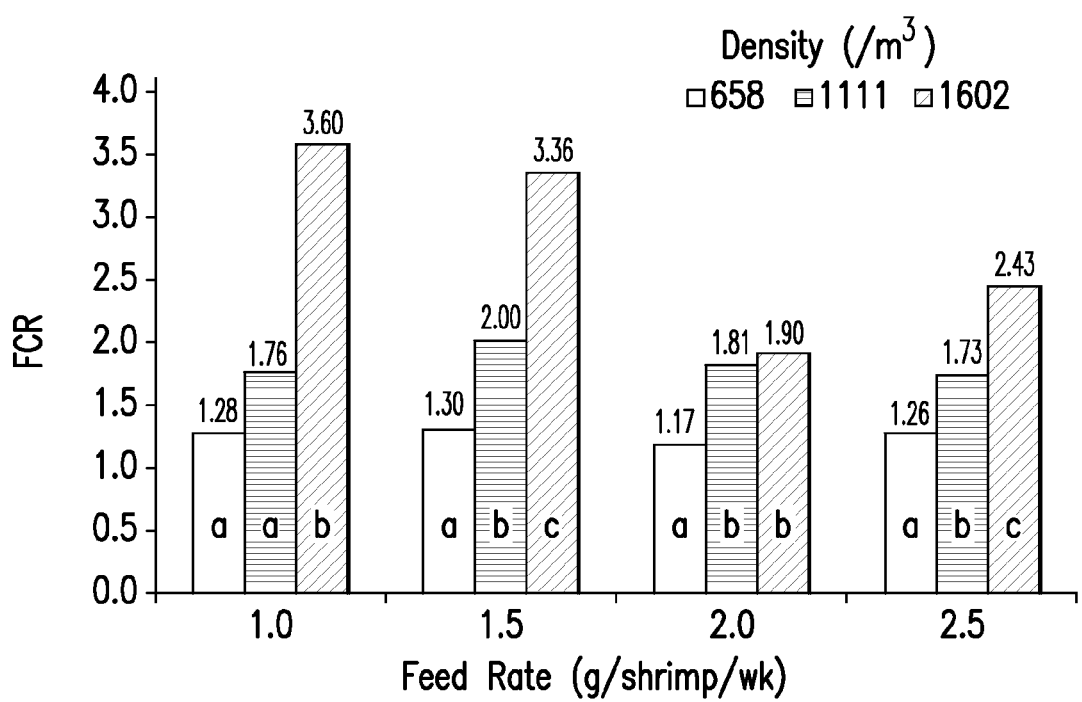
FIG. 18 illustrates the effect of feed rate and density on feed conversion. Values represent mean ± standard error of means for 4-5 replicates.

Results of two-way ANOVA indicated that differences in feed conversions due to stocking density, feed rate, and interaction of density and feed rate were all significant. Results are shown in FIGS. 17 and 18. One-way ANOVA for density indicated that, at density $658/m^3$, FCR was significantly lower (1.17) at feed rate 2.0. There were no significant differences in FCR values between rest of the feed rates (FCR range 1.26 and 1.29). Differences in FCR values between feed rates were not significant for densities $1111/m^3$ (FCR range: 1.73 to 2.00) and $1602/m^3$ (FCR range: 1.89 to 3.59). Results of one-way ANOVA for feed rate indicated that FCR values for feed rate of 1.0 were significantly lower for two low densities (1.27 and 1.75 for densities $658/m^3$ and $1111/m^3$ respectively) compared to high density (3.59 for $1602/m^3$). FCR increased with density at feed rate 1.5. At feed rate 2.0 significantly low FCR (1.72) was observed at density $658/m^3$. Differences in FCR values for two high densities were not significant (1.82 and 1.89). FCR increased with density at feed rate 2.5. Feed conversions ranging from 1.17 to 1.29 at the lowest density indicate higher feed consumption resulting in higher growth. Feed conversions were in general towards higher side at two higher densities compared to the low density. High feed conversions at density $1602/m^3$ resulted from high mortality and thus excess feed remained unutilized.

High levels of production from this Example 2 resulted from feed and other tank management practices. Low water depth coupled with high water exchange may we significant.

Due to low water depth, visual observation of tank bottom became increasingly easy compared to traditional tanks or ponds operating at high water depths. Dead shrimp, if any, were removed without significant delay. By doing so, tank water could be kept from fouling due to mortality. This lack of fouling was also aided by high water exchange. Uneaten feed were observed only in tanks with high mortality. In general, high water exchange was beneficial in flushing the tank bottom, and offsetting poor water quality conditions resulting from uneaten leftover feed.

Overall, Example 2 shows that the following results can be obtained with water depth as low as 20 cm:

Shrimp survival of 99.9% with over 24 g final weight, and 2.42 g/wk growth, with over 15 $kg/m^3$ biomass with FCR 1.26 can be achieved at density $658/m^3$.

Shrimp survival of 94% with over 20 g final weight, and 1.91 g/wk growth, with 21 $kg/m^3$ biomass with FCR 1.73 can be achieved at density of $1111/m^3$.

Shrimp survival of 95%, over 16 g final weight, and 1.39 g/wk growth, with 25 $kg/m^3$ biomass with FCR 1.9 can be achieved at density $1602/m^3$.

Growth rate of 1.91 g/wk with survival of 94% at a feed rate of 2.5 g/shrimp/wk at density of $1111/m^3$ with a production of 21 $kg/m^3$. Growth rate of 1.39 g/wk with survival of 95% at a feed rate of 2.5 g/shrimp/wk at density of $1602/m^3$ with a production of 25 $Kg/m^3$.

A feed rate of 1.5 g/shrimp/wk may be adequate for density $1602/m^3$ without affecting growth.

Although only exemplary embodiments of the invention are specifically described above, it will be appreciated that modifications and variations of these examples are possible without departing from the spirit and intended scope of the invention. For example, one of ordinary skill in the art will appreciate that measurements, particularly of raceway dimensions, shrimp weight and time are approximate and may be varied to some degree without departing from the spirit and scope of the invention. One of ordinary skill in the art will also appreciate that in most instances, the weight of the water contained accounts for most of the raceway weight. Accordingly, it may be possible to stack raceways having walls higher than described herein, but in which water depth is nevertheless around the recited wall heights.

The invention claimed is:

1. A method of shrimp aquaculture comprising:
   stocking a first raceway of a set of raceways, the first raceway having a first average depth with postlarval shrimp;
   growing the shrimp to a first predetermined size to give a first phase of shrimp;
   transferring the first phase of shrimp to at least one additional raceway in the set of raceways, each additional raceway having at least one additional average depth, wherein each sequential average depth is greater than the prior average depth; and
   growing the shrimp to a final predetermined size to give a final crop of shrimp;
   and harvesting the final crop of shrimp,
   wherein each raceway has a length and width, two side walls and a sloped bottom with a bottom nadir or a bottom apex, the sloped bottom joining each side wall at two side wall junctions, slope from the bottom nadir to the side wall junctions or from the side wall junctions to the bottom apex from between 0.05% and 20%.

2. The method according to claim 1, wherein the set of raceways includes at least two additional raceways, the method further comprising growing the shrimp to an additional predetermined size in each additional raceway prior to transferring the shrimp to a next additional raceway having a next largest average depth.

3. The method according to claim 1, wherein transferring comprises transferring substantially all shrimp from one raceway to a next raceway.

4. The method according to claim 1, wherein the final predetermined size is between 18 to 35 g/shrimp.

5. The method according to claim 1, further comprising repeating the steps to produce up to 18 shrimp crops per year.

6. The method according to claim 1, wherein the set of raceways contain water having a total water volume, and wherein harvesting yields between 7 and 70 kg shrimp/m.sup.3 total water volume/shrimp crop.

7. The method according to claim 1, wherein the shrimp have a survival rate of between 70% and 98%.

8. The method according to claim 1, wherein the shrimp have an average growth rate of between 1.3 and 3.0 g/week.

9. The method according to claim 1, wherein the method has a feed conversion ratio of between 1.0 and 1.6.

10. The method according o claim 1, further comprising circulating the water within at least one raceway.

11. The method according to claim 1, wherein harvesting the shrimp crop comprises harvesting less than substantially all of the shrimp to leave remaining shrimp, the method further comprising:
transferring the remaining shrimp to a further additional raceway; growing the shrimp to a further additional predetermined size; and
harvesting substantially all of the shrimp crop.

12. A shrimp aquaculture system comprising:
a set of at least two raceways, similar or varied in size and shape, each corresponds to a stage in shrimp production, each having an average depth, a length and a width, and each comprising:
two ends;
two side walls each having a top, a bottom, a side wall depth, and average side wall depth;
a sloped bottom having an average internal depth, and a bottom apex wherein the bottom slopes downwardly from a bottom longitudinal line near or at the center and joining each side wall at two side wall junctions, wherein the slope bottom is configured for ease of transfer of shrimp from one raceway to another and for ease of waste removal;
water having an average water depth in the set of raceways of 30 cm or less and a total volume in the set of raceways; and
a water maintenance or circulation system,
wherein the sloped bottom of each raceway has a slope from the side wall junctions to the bottom apex from between 0.05% and 20%,
wherein the average depth of the raceways increases;
wherein at least one of the at least two raceways is stacked at least partially on top of another of the raceways, and
wherein the water maintenance or circulation exchanges water in an amount up to 1000% of the total volume of the water in the set or raceways per day.

13. A shrimp aquaculture structure comprising:
a set of at least two raceways, similar or varied in size and shape, each corresponds to a stage in shrimp production, each having an average depth, a length and a width, and each comprising:
two ends;
two side walls each having a top, a bottom, a side wall depth, and an average side wall depth; and
a sloped bottom having an average internal depth, and a bottom apex wherein the bottom slopes downwardly from a bottom longitudinal line near or at the center and joining each side wall at two side wall junctions, wherein the sloped bottom is configured for ease of transfer of shrimp from one raceway to another and for ease of waste removal;
wherein the sloped bottom of each raceway has a slope from the side wall junctions to the bottom apex from between 0.05% and 20%, wherein one of the at least two raceways is stacked at least partially on top of another of the raceways; and a water maintenance or circulation system.

14. The structure according to claim 13, wherein the two ends of each raceway comprise a shallow end and a deep end of each raceway, and wherein each raceway has a slope along its length from the shallow end to the deep end of between 0.0% and 1.0%.

15. The structure according to claim 13, wherein the two ends of each raceway are substantially level.

16. The structure according to claim 13, wherein the two ends of each raceway comprise a shallow end and a deep end of each raceway, and wherein the side wall depth increases from the shallow end to the deep end of each raceway.

17. The structure according to claim 13, wherein the set of raceways comprises at least three raceways and wherein the first two of the at least three raceways are combined in a single combination raceway comprising an internal divider.

18. The structure according to claim 17 wherein the combination has an average side wall depth of 3 cm to 14 cm.

19. The structure according to claim 13, wherein the side wall depth of each raceway is between 2.5 cm and 50 cm.

20. The structure according to claim 13, wherein the average internal depth of each raceway is between 2.5 cm and 50 cm.

21. The structure according to claim 13, wherein the width of each raceway is between 2 m and 10 m and the length of each raceway is between 10 m and 100 m.

22. The structure according to claim 13, comprising a third raceway having an average side wall depth of 7 cm to 22 cm.

23. The structure according to claim 13, comprising a fourth raceway having an average side wall depth of 11 cm to 30 cm.

24. The structure according to claim 13, comprising a fifth raceway having an average side wall depth of 15 cm to 38 cm.

25. The structure according to claim 13, wherein the set of raceways are all stacked on top of one another.

26. The structure according to claim 13, wherein the raceways are stacked between 80 cm and 110 cm apart.

27. The structure according to claim 13, wherein the raceways contain water, the water having an average water depth among all the raceways of 30 cm or less.

28. The structure according to claim 13, comprising at least one barrier above or around the sides of at least one raceway.

* * * * *